United States Patent [19]

Hirayama

[11] Patent Number: 4,970,550

[45] Date of Patent: Nov. 13, 1990

[54] COPYING SYSTEM CAPABLE OF DESIGNATING A COPYING AREA

[75] Inventor: Yoshiyuki Hirayama, Iwatsuki, Japan

[73] Assignee: Fuji Xerox Corp. Ltd., Tokyo, Japan

[21] Appl. No.: 212,878

[22] Filed: Jun. 29, 1988

[30] Foreign Application Priority Data

Jan. 19, 1988 [JP] Japan .................................. 63-8802

[51] Int. Cl.⁵ ............................................. G03G 15/00
[52] U.S. Cl. ...................................... 355/200; 355/218
[58] Field of Search .................... 355/3 R, 7, 14 R, 6, 355/200, 212, 209, 218; 340/706, 696

[56] References Cited

U.S. PATENT DOCUMENTS

| | | | |
|---|---|---|---|
| 4,243,843 | 1/1981 | Rocheleau | 178/19 |
| 4,582,417 | 4/1986 | Yagasaki et al. | 355/218 |
| 4,679,927 | 7/1987 | Sogo et al. | 355/218 |
| 4,682,875 | 7/1987 | Suzuki | 355/209 |
| 4,707,109 | 11/1987 | Kanno et al. | 355/7 |
| 4,727,600 | 2/1988 | Avakian | 455/607 X |
| 4,734,789 | 3/1988 | Smith et al. | 355/7 X |
| 4,764,789 | 8/1988 | Iwaki et al. | 355/3 R X |
| 4,780,806 | 10/1988 | Wada et al. | 355/6 X |
| 4,806,978 | 2/1989 | Nakatani et al. | 355/7 X |

FOREIGN PATENT DOCUMENTS

| | | |
|---|---|---|
| 0179373 | 4/1986 | European Pat. Off. . |
| 2115635 | 9/1983 | United Kingdom . |
| 2131251 | 6/1984 | United Kingdom . |

*Primary Examiner*—Joan H. Pendegrass
*Attorney, Agent, or Firm*—Spensley, Horn, Jubas & Lubitz

[57] ABSTRACT

An image forming system comprises a copying device, an area designating device for designating a specific area to be copied or not to be copied on a document, and a data conveying means for conveying to the copying device a coordinates data representative of the specific area and a mode data indicating that the specific area is to be copied or not to be copied. The area designating device is provided separately from the copying device.

5 Claims, 4 Drawing Sheets

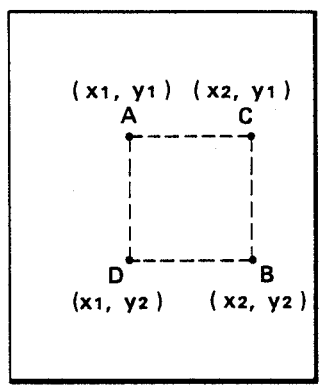
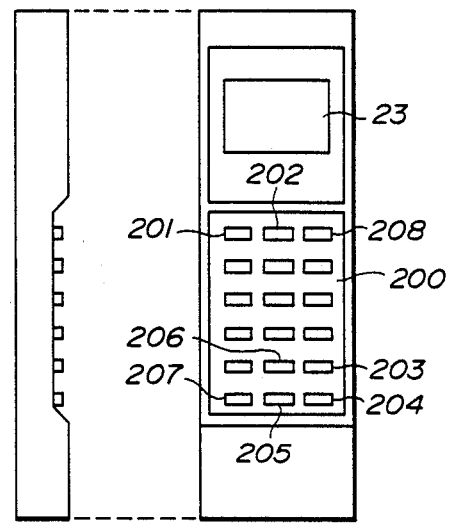
FIG. 2    FIG. 3(a)    FIG. 3(b)

| START SIGNAL | NUMBER OF DESIGNATED AREAS | MODE DATA | COORDINATES DATA | COORDINATES DATA | COORDINATES DATA | END SIGNAL |

(a) START SIGNAL (b) END SIGNAL (c) DATA "0"

(d) DATA "1"

COPYING SYSTEM CAPABLE OF DESIGNATING A COPYING AREA

BACKGROUND OF THE INVENTION

This invention relates to an image forming system, and more particularly to an image forming system with an editing function to copy only a specific area of a document or not to copy the specific area and copy other area of the document.

There has been known in image forming apparatus with an editorial function to copy only a specific area on a document or not to copy the specific area, in addition to ordinary copying function to copy every image on the document.

In this type of the image forming apparatus, a document table is provided and to copy a document of equal to or less than A2 size, the document is placed on the document table, and is optically scanned for reading the image information on the document. Then, the copy machine executes the copying operation by using the image information thus read. Further, a desired or specific area on the document, that is, an area to be copied or not to be copied, can be readily designated in terms of the coordinates, which are obtained with respect to a reference point provided on the document table.

However, in conventional image forming apparatus for copying documents of A1 size or larger, the apparatus is not provided with a document table, but is so arranged that the document per se is moved for reading the image information on the document without providing the document table. Therefore, it is impossible for the apparatus not provided with a document table to obtain a reference point for obtaining the coordinates data of the specific area.

To cope with this, a coordinates pick-up device is separately provided to pick up the coordinates of the specific area. The picked up coordinates data are entered into the image forming apparatus by means of ten keys on the operation board of the apparatus.

In case that many areas of the document are to be designated, the document is set on the coordinates pick-up device to pick up the coordinates of those areas. The picked up coordinates are then written on a memo by an operator. Then, the coordinates data are inputted into the image forming apparatus by means of the ten keys. This work is troublesome, and the data may be mistakenly written on the memo. This leads to mistaken data input.

SUMMARY OF THE INVENTION

Accordingly, an object of this invention is to provide an image forming system capable of designating the specific area on a document effectively and exactly by providing an area designating device separately from the copying or image reproducing device.

To achieve the above object, there is provided an image forming system comprising: an area designating device including an input unit for inputting coordinates data of a specific area on a document and a mode data specifying either the specific area is to be copied and areas other than the specific area are not to be copied or the specific area is not to be copied and the other areas are to be copied and a transmitting unit for transmitting both the coordinates data and the mode data inputted by the input unit, and an image reproducing device including a receiving unit for receiving the coordinates data and the mode data both transmitted from the transmitting unit and a copying unit for copying the specific area and not copying the other areas or for not copying the specific area and copying the other areas according to the coordinates data and the mode data, in which the area designating device is separately provided from the image reproducing device whereby the specific area on a document may be designated at a location apart from the copying device, and after the coordinates of the specific area are picked up by a coordinates pick-up device, the specific area designation may be performed effectively and exactly.

BRIEF DESCRIPTION OF THE DRAWINGS

FIG. 2 shows a diagram useful in explaining a specific area on a document;

FIGS. 3(a) and 3(b) respectively show plan and side views illustrating an area designating device;

FIGS. 5(a) through 5(d) and 6(a) and 6(b) show waveforms of signals representative of the coordinates/mode data;

DETAILED DESCRIPTION OF THE PREFERRED EMBODIMENTS

Figure 1:
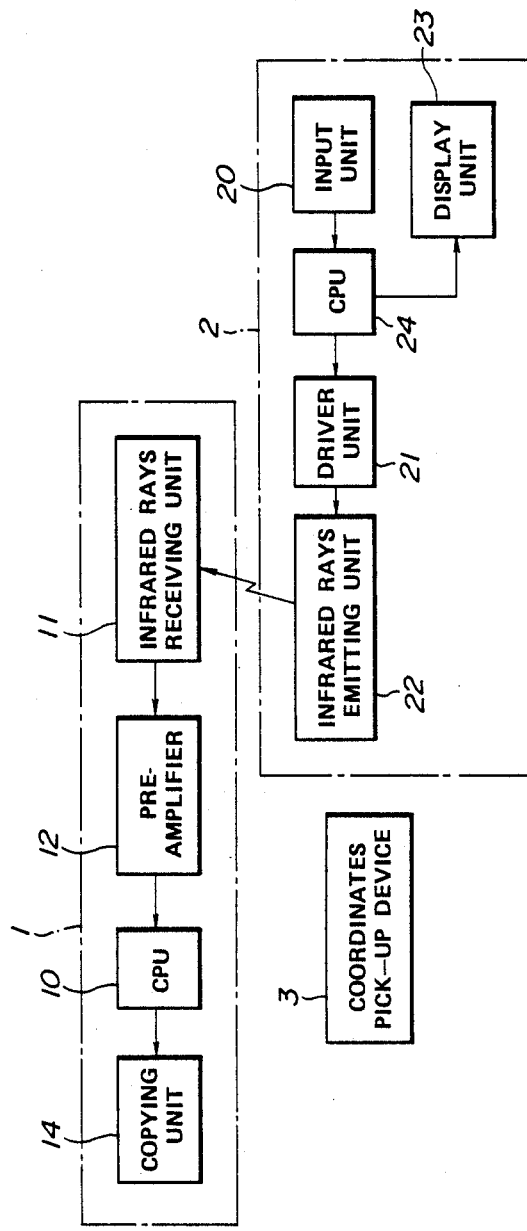
FIG. 1 shows a block diagram of an image forming system according to an embodiment of this invention.

Reference is first made to FIG. 1 illustrating in block form an arrangement of an embodiment of an image forming system according to this invention. As shown, the image forming system comprises a copying device 1, an area designating device 2 and a coordinates pick-up device 3. The copying device 1 may be of an electronic photo type, and includes a central processing unit (CPU) 10, an infrared rays receiving unit 11, a preamplifier 12, and a copying unit 14. The CPU 10 controls the sections of the copying unit 14, such as a photosensitive drum and a developer. The infrared rays receiving unit 11 receives the infrared rays containing the coordinates data and the mode data of the designated area on the document. The infrared rays are emitted from the area designating device 2. The preamplifier 12 amplifies a data signal outputted from the infrared rays receiving unit 11, and applies the amplified data signal to the CPU 10.

The area designating device 2 is made up of an input unit 20, a driver unit 21, an infrared rays emitting unit 22, a display unit 23, and a CPU 24. The input unit 20 contains ten keys for entering an area on a document to be copied or not to be copied in terms of the coordinates (coordinate data) as plotted with respect to a reference point on the coordinates pick-up device 3 and in terms of "copy" or "uncopy" (mode data). The CPU 24 fetches the coordinates data of the designated area, and the mode data, processes these data into coordinate/mode data, and transfers the coordinates/mode data through the driver unit 21 to the infrared rays emitting unit 22 as well as directly transfers that data to the display unit 23.

To designate a specific area on a document as a copied area or an uncopied area, the coordinates of that area are picked up by the coordinates pick-up device 3. To be more specific, to designate a square area enclosed by a broken line in an image on a document 4 shown in FIG. 2, of the corner points A, B, C, and D in this area, a pair of points A (X1, Y1) and B (X2, Y2), which are located at opposing ends of one of the diagonal lines of the square area, and another pair of points C (X2, Y1) and D (X1, Y2), which are located at opposing ends of the other diagonal line, are picked up, and the coordinates data thus picked up are inputted into the CPU 24 by the input unit 20. In this case, an operator determines if this area is to be copied or not to be copied, and enters the result of decision as mode data. The CPU 24 sequentially fetches the coordinates data of the designated area and the mode data, produces coordinates/mode data, and causes the display unit 23 to visually present these pieces of data. After the data of all of the designated areas are entered, the input unit 20 is operated for the completion of the designation. Upon this operation, the coordinates/mode data consisting of the coordinates data and the data indicative of "to be copied or not to be copied" is outputted from the CPU 24. The data is converted into a signal representative of the coordinates data and mode data by the driver unit 21. The signal is then applied to the infrared rays emitting unit 22. Upon receipt of this signal, the infrared light emitting unit 22 emits the infrared rays containing the coordinates/mode data toward the copying device 1.

In the copying device 1, the infrared rays receiving unit 11 receives the infrared rays and converts the rays into an electrical signal containing the coordinates/mode data. The CPU 10 receives the data signal through the preamplifier 12. When the designated area is the one which is to be copied, the CPU 10 controls a light exposing section (not shown) of the copying unit 14 such that the other area of the document than the designated one is not exposed by light, and controls the copying unit 14 such that when a copy start switch (not shown) is operated, the copying unit 14 starts the copying operation of only the designated area of the document. When the designated area is the one which is not to be copied, the CPU 10 controls the light exposure section such that the designated area is not exposed by the light, and controls the copying unit 14 such that when the copy start switch is operated, the copying unit 14 starts the copying operation of only the other area than the designated one.

FIG. 3(a) and 3(b) show respectively plan and side views showing an appearance of the area designating device 2. The input unit 20 is provided with many types of keys; numerical or ten keys 200 for entering the coordinates of a specific area or areas, a mode select key 201 for selecting either one of a copy mode for copying the designated area and/or an uncopy mode for not copying the designated area, an area select key 202 for designating a plurality of areas by assigning an area number to each area, a set key 203 for entering the completion of the entry of a set of coordinates data and mode data, a transmission key 204 for starting the transmission of the coordinates/mode data, a power-on key 205, a clear key 206 for cancelling mistaken key operations, an all clear key 207 for clearing all the designated areas, and a memory select key 208 for selecting a preset designated area.

As mentioned earlier, the coordinates data are entered in terms of the coordinates at two points located at the ends of the diagonal lines of the designated square area. Namely, the coordinates (X1, Y1) at point A in FIG. 2 are entered by using the ten keys, and the set key 203 is pushed. Then, the coordinates (X2, Y2) at point B are entered by using the ten keys 200, and the set key 203 is pushed again. At this point, the coordinates of one designated area have been entered. If another designated area exists, the area select key 202 is pushed, and the coordinates of this another area are entered in a manner as just mentioned. After the completion of the entry of the coordinates of the designated areas, the mode select key 201 is used for selecting the copy mode or the uncopy mode. In the copy mode, the copying device copies the designated area on the document, while in the uncopy mode, the device does not copy the image information of the designated area. The designated area frequently used is previously stored in a memory, and if necessary, it can be recalled by the memory select key 208.

Following the completion of the area designation and mode selection, the infrared rays emitting unit 22 is directed toward the infrared rays receiving unit 11, and the transmission key 204 is operated. The coordinates/mode data of the designated areas thus entered are transmitted by means of the infrared rays to the copying device 1.

Figures 4, 5:
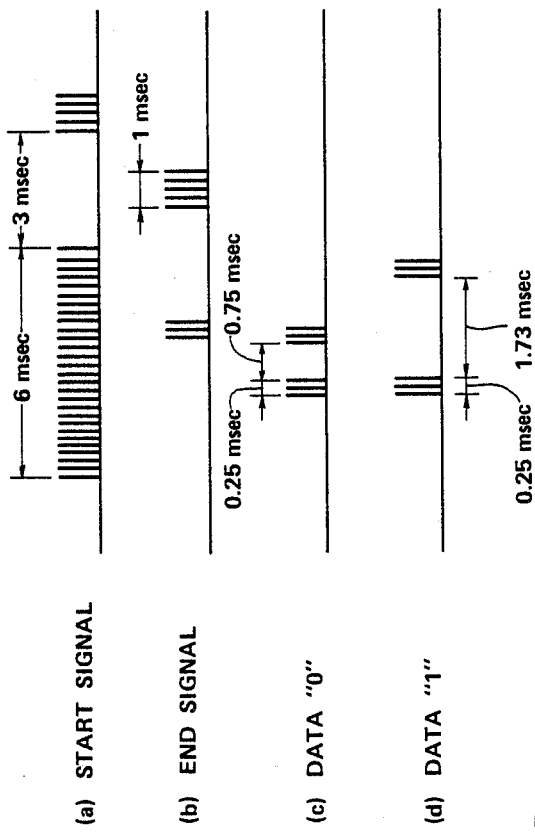
FIG. 4 shows a format of the coordinates/mode data for a designated specific area to be transmitted.

The coordinates/mode data contained in the infrared rays has a format as shown in FIG. 4. As shown, several types of data are interposed between the start and end signals. Those pieces of data contain the data representative of the number of designated areas, the mode data indicative of the copy mode or uncopy mode, and the data representative of the coordinates of the designated areas. The signal waveforms of the data are shown in FIGS. 5(a) to 5(d). Each data is expressed by a train of pulses. The burst signal as formed by turning on and off the infrared-rays emitting unit 22 at 40 kHz, for example, is used for the pulse train. In this case, the time duration of a group of recurring burst signals and the interval between the adjacent burst signal groups are varied according to the contents of the data. In the start signal shown in FIG. 5(a), the time duration of the burst signal is 6 m sec and the interval between the burst signals is 3 m sec.

Figure 6:
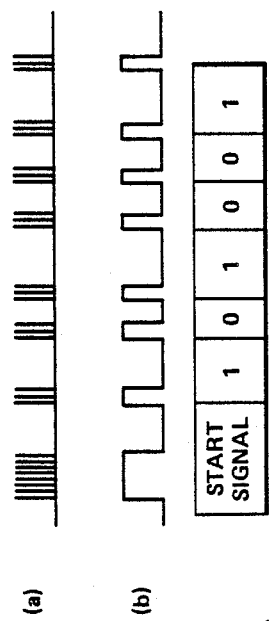

For example, to transmit the data of "101001" following the start signal, the data is transmitted as a burst signal with a pattern as shown in FIG. 6(a). The burst signal is applied to the preamplifier 12 of the copying device 1. The burst signal is waveshaped by the preamplifier 12, and demodulated into a signal with a pattern as shown in FIG. 6(b), and inputted to the CPU 10 recognizes the contents of the received data on the basis of the pulse width and the pulse interval of the received burst signal pattern.

As described above, the embodiment as mentioned above is so arranged that the coordinates/mode data of a desired area or areas is transmitted to the copying device 1 by using the infrared rays. The coordinates of the desired area are picked up by the coordinates pickup device 3, and are entered into the area designating device 2 by operating appropriate keys on the operation board of the area designating device 2. At the same location, viz., without the movement of an operator to the copying device 1, the operator may determine if the designated area is to be copied or not to be copied, and enter the result of the determination (mode data) into the area designating device 2.

Figure 7:
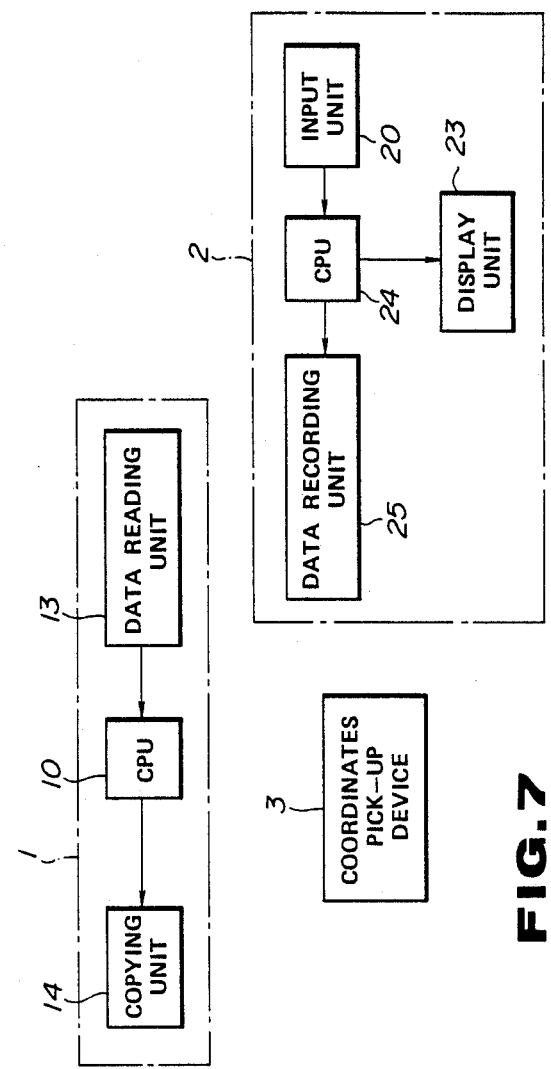
FIG. 7 shows a block diagram of an image forming system according to another embodiment of this invention.

Turning now to FIG. 7, there is shown another embodiment of an image forming system according to this invention. The second embodiment employs a data recording unit 25 for recording the coordinates/mode data of the designated area or areas into a recording medium such as a magnetic card. The recording medium with the coordinates data recorded therein is hand-carried to the copying device 1 by an operator and set to a reader 13 of the copying device 1 which in turn reads in the coordinates/mode data at the data reading unit 13, while in the first embodiment, the same data are transmitted to the copying device 1 by using the infrared rays. In this case, the direction to copy or not to copy the designated area may be entered when the recording medium is set to the copying device 1. In this embodiment, an operator must carry the recording medium to the place where the copying device is installed. However, there is no need for writing the picked up coordinates data on a memo paper, eliminating the mistaken designation of the specific areas on the document.

The second embodiment is preferred in the case that an obstacle exists by which the transmission of the coordinates/mode data by means of infrared rays is prevented between the copying device 1 and the area designating device 2.

What is claimed is:

1. A copying system capable of designating a copying area comprising:
   (a) an area designating device including:
      input means, including a transmission key switch, for inputting coordinates data of a specific area on a document and mode data specifying either said specific area is to be copied and areas other than said specific area are not to be copied or said specific area is not to be copied and said other areas are to be copied;
      display means for displaying coordinate values of said coordinates data inputted into said input means;
      converting means for converting said coordinates data and said mode data into a coordinates data signal and a mode data signal, respectively;
      memory means for storing said coordinates data signal and said mode data signal converted by said converting means until said transmission key switch is activated; and
      light signal generating means for successively transmitting a light signal obtained by further converting said coordinates data signal and said mode data signal stored in said memory means after said transmission key switch is activated; and
   (b) a copying device, separately provided from said area designating device, for copying said specific area and not copying said other areas or for not copying said specific area and copying said other areas according to said coordinates data signal and said mode data signal of said light signal received from said light signal generating means, including:
      a light signal receiving means for receiving said coordinates data signal and said mode data signal of the light signal successively transmitted from said light signal generating means of said area designating device; and
      a preamplifier for amplifying outputs from said light signal receiving means.

2. A copying system according to claim 1, wherein said light signal is carried by infrared rays.

3. A copying system according to claim 1, wherein said light signal receiving means is an infrared rays receiving means.

4. A copying system according to claim 1, wherein said light signal generating means is an infrared ray generating means.

5. A copying system according to claim 1, wherein said area designating device further comprises first processing means for controlling the functions of the input means, display means, converting means and light signal generating means and wherein said copying device includes a separate second processing means for controlling the functions of the copying device.

* * * * *